United States Patent [19]
Douglas et al.

[11] Patent Number: 5,290,974
[45] Date of Patent: Mar. 1, 1994

[54] TAB AND NOTCH LOCATOR FOR EXHAUST SYSTEMS

[75] Inventors: Arthur D. Douglas, Taylorsville; Freddie A. Baldwin, Columbus; Alan L. Brittingham, Seymour, all of Ind.

[73] Assignee: Arvin Industries, Inc., Columbus, Ind.

[21] Appl. No.: 30,633

[22] Filed: Mar. 12, 1993

[51] Int. Cl.⁵ .................................. F01N 7/08
[52] U.S. Cl. .................... 181/228; 181/243; 181/282
[58] Field of Search ............. 181/243, 255, 282, 228, 181/227; 285/7, 330, 319, 921, 158, 390, 391

[56] References Cited

U.S. PATENT DOCUMENTS

| | | |
|---|---|---|
| 1,260,690 | 3/1918 | Liady .................. 285/330 |
| 1,313,179 | 8/1919 | Gray . |
| 1,379,141 | 5/1921 | Vasselli . |
| 1,515,355 | 11/1924 | Mitchell . |
| 1,878,829 | 9/1932 | Crouch . |
| 1,903,852 | 4/1933 | Rollins . |
| 1,995,542 | 3/1935 | Haviland . |
| 1,998,653 | 4/1935 | Briegel . |
| 2,091,732 | 8/1937 | Haviland . |
| 2,156,395 | 5/1939 | Klouman . |
| 2,500,720 | 3/1950 | van der Heem ........ 285/330 |
| 2,712,950 | 7/1955 | Siebert . |
| 2,794,961 | 6/1957 | Knight .............. 285/330 |
| 3,066,959 | 12/1962 | White . |
| 3,178,208 | 4/1965 | Koehler . |
| 3,222,090 | 12/1965 | Powers et al. . |
| 3,386,529 | 6/1968 | Pannone . |
| 3,813,115 | 5/1974 | French ............... 285/330 |
| 4,260,180 | 4/1981 | Halushka et al. ........ 285/391 X |
| 4,475,623 | 10/1984 | Gerber et al. . |
| 4,565,260 | 1/1986 | Scheidt et al. . |
| 4,570,747 | 2/1986 | Ortyl . |
| 4,902,048 | 2/1990 | Washizu . |
| 4,902,049 | 2/1990 | Umehara . |
| 5,176,406 | 1/1993 | Straghan .............. 285/319 |

*Primary Examiner*—Michael L. Gellner
*Assistant Examiner*—Khanh Dang
*Attorney, Agent, or Firm*—Barnes & Thornburg

[57] ABSTRACT

A system is provided for orienting two engaged exhaust pipes or conduits and maintaining a proper orientation between those pipes after engagement to provide a proper alignment between the pipes. The system includes a tab formed on one of the pipes and a tab-receiving notch formed on the other of the pipes.

20 Claims, 3 Drawing Sheets

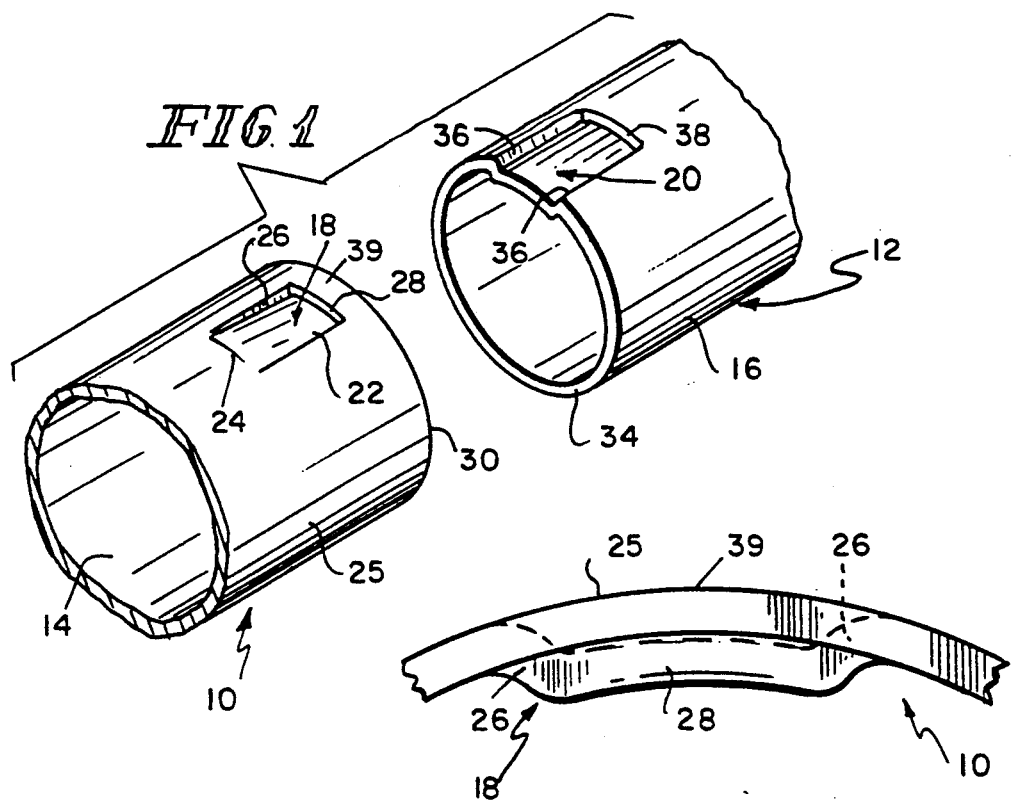
FIG. 1
FIG. 2
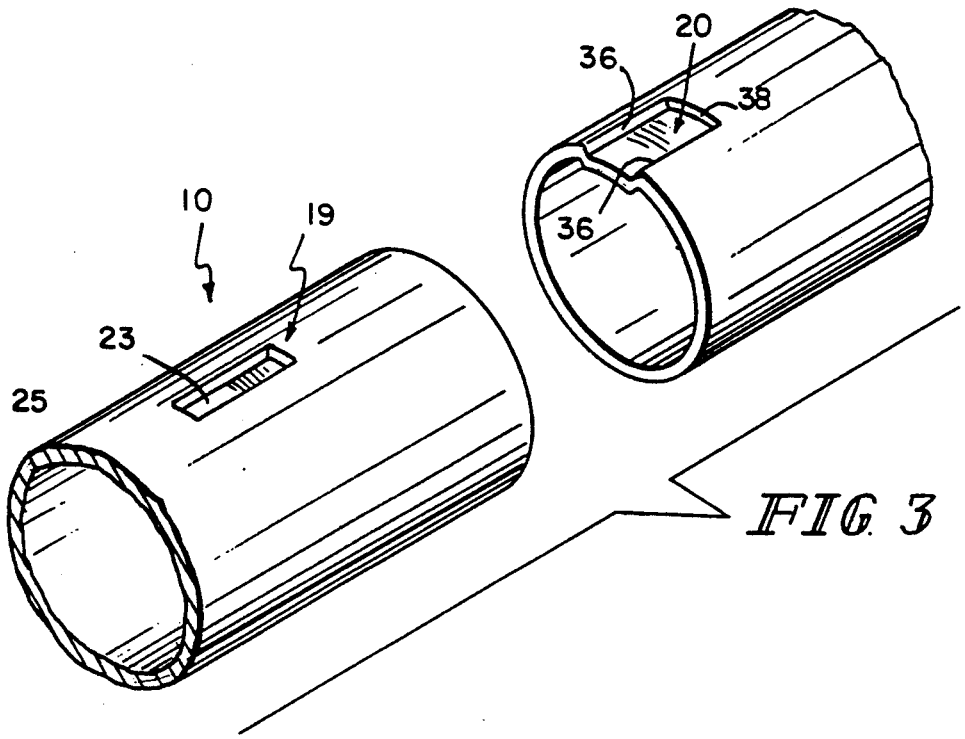
FIG. 3

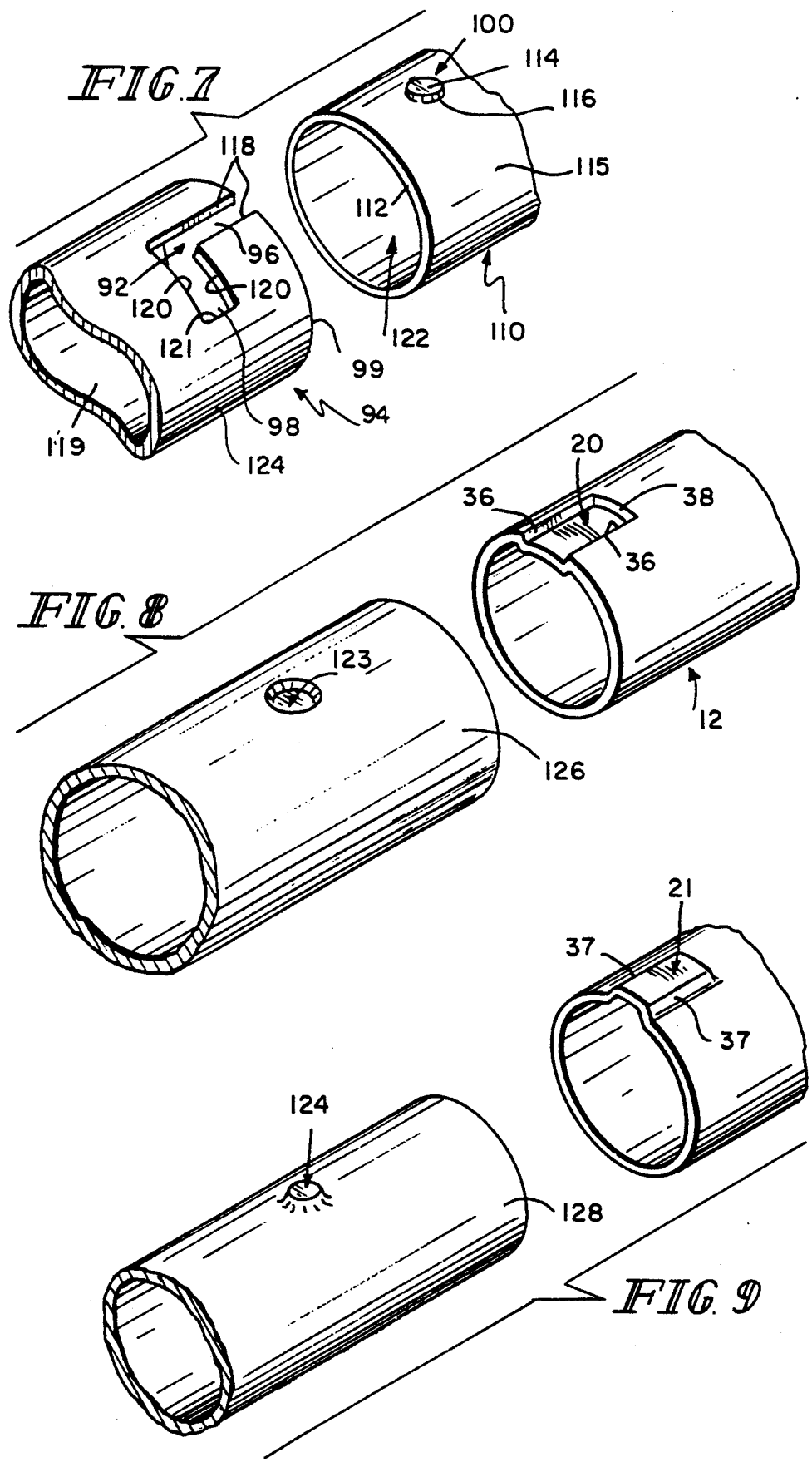

TAB AND NOTCH LOCATOR FOR EXHAUST SYSTEMS

BACKGROUND AND SUMMARY OF THE INVENTION

The present invention relates to exhaust systems, and particularly to an apparatus for aligning a muffler and an exhaust conduit during manufacturing and assembly. More particularly, the invention relates to an apparatus for orienting two exhaust pipes or conduits which are configured to engage each other and for maintaining a proper orientation after assembly to provide a proper alignment between the exhaust conduits.

In today's automotive applications, a single piece of exhaust conduit is often required to extend a considerable distance along a vehicle and to bend around various obstructions along its path. Alternatively, several sections of exhaust pipe must be joined together to complete the exhaust conduit. Each pipe section has a specific shape to avoid obstacles. In either case, the exhaust conduit, or individual pipe sections, requires a particular orientation relative to the muffler, or to other pipe sections, so that the entire exhaust system is properly fitted to the vehicle. In order to facilitate the manufacturing process of forming a conduit with complex bending requirements, a mechanism is needed that allows the exhaust pipe and muffler or individual pipe sections to be easily located relative to each other and properly aligned quickly and accurately.

One known method for aligning an exhaust conduit and a muffler pipe is to weld a separate piece of material on the muffler pipe or the exhaust conduit to act as an alignment tab. However, this known method involves an additional material cost for the separate piece of material, as well as the additional labor costs for the manufacturing steps of aligning the tab on the muffler pipe or the exhaust conduit, holding the tab in place, and welding the tab.

One object of the present invention is the provision of an alignment apparatus for an exhaust system which does not require the additional cost for the tab and the aligning and welding steps.

According to one aspect of the present invention, an exhaust system includes a first exhaust conduit formed to include a radially inwardly extending indentation oriented at an angle relative to an outer wall of the first exhaust conduit. The indentation has a first end substantially aligned with an outer wall of the first exhaust conduit, a second end located radially inwardly from an inner wall of the first exhaust conduit, and first and second side walls extending between the first and second ends to define a radially inwardly extending, angled tab. The exhaust system also includes a second exhaust conduit coupled to the first exhaust conduit. The second exhaust conduit is formed to include a notched section complementary to the tab. The notched section includes first and second side walls and an end wall for engaging the first and second side walls and the second end wall of the tab on the first exhaust conduit, respectively, to align the second exhaust conduit relative to the first exhaust conduit and to prevent rotation of the second exhaust conduit relative to the first exhaust conduit.

The first exhaust conduit includes an end edge spaced apart from the second end wall of the indentation to define a band therebetween. The band abuts an outer surface of the second exhaust conduit upon insertion of the first exhaust conduit over the second exhaust conduit. The notched section may also be cut out of the second exhaust conduit to fit the first exhaust conduit.

According to another aspect of the present invention, an exhaust system includes a muffler having a muffler head formed to include an outwardly extending projection and a tab formed on the projection. The exhaust system also includes a nipple configured to be inserted through the projection of the muffler head, and an exhaust conduit for conducting combustion product from the muffler to the atmosphere. The exhaust conduit is sized for insertion over the nipple to couple the exhaust conduit to the muffler head. The exhaust conduit is formed to include a notched section for engaging the tab formed on the projection of the muffler head to align the exhaust conduit relative to the muffler head and to prevent rotation of the exhaust conduit relative to the muffler head.

In one illustrated embodiment, the notched section formed in the exhaust conduit extends radially outwardly from an outer surface of the exhaust conduit. The notched section may also be cut out of the exhaust conduit.

The tab includes first and second side walls and an end wall extending radially outwardly from an outer surface of the nipple. The notched section is formed to include first and second side walls and an end wall for engaging the first and second side walls and the end wall of the tab, respectively, upon insertion of the exhaust conduit over the nipple.

The nipple includes an end edge spaced apart from the end wall of the tab to define a band therebetween. The band abuts an inner surface of the exhaust conduit upon insertion of the exhaust conduit over the nipple.

According to yet another aspect of the invention, an exhaust system includes a first exhaust conduit formed to include an embossed tab having first and second side walls and an end wall. The exhaust system also includes a second exhaust conduit coupled to the first exhaust conduit. The second exhaust conduit is formed to include a notched section complementary to the tab. The notched section includes first and second side walls and an end wall for engaging the first and second side walls and the end wall of the tab formed on the first exhaust conduit, respectively, to align the second exhaust conduit relative to the first exhaust conduit and to prevent rotation of the second exhaust conduit relative to the first exhaust conduit. The notched section may also be cut out of the second exhaust conduit to fit the first exhaust conduit.

According to still another aspect of the invention, an exhaust system includes a first exhaust conduit formed to include an embossed tab therein. The tab has a predetermined width dimension. The exhaust system also includes a second exhaust conduit coupled to the first exhaust conduit. The second exhaust conduit is formed to include a generally L-shaped notch therein. The L-shaped notch includes an axially extending section in communication with an end edge of the second exhaust conduit and a circumferentially extending section in communication with the axially extending section and spaced apart from the end edge. The L-shaped notch is defined by side walls which are spaced apart by a distance substantially equal to the width dimension of the tab for receiving the tab therein to align the second exhaust conduit relative to the first exhaust conduit and to prevent axial movement of the second exhaust conduit relative to the first exhaust conduit when the tab is positioned in the circumferentially extending section of the L-shaped notch.

In one illustrated embodiment, the tab extends radially outwardly from an outer surface of the first exhaust conduit. The L-shaped notch is formed either by stamping an L-shaped section out of the second exhaust conduit or by forming a radially outwardly extending section relative to an outer surface of the second exhaust conduit.

In another embodiment, the tab extends radially inwardly from an outer surface of the first exhaust conduit. The L-shaped notch is formed either by stamping an L-shaped section out of the second exhaust conduit or by forming a radially inwardly extending section in an outer surface of the second exhaust conduit.

By providing a tab that is stamped into or embossed on a muffler projection or exhaust conduit, the present invention advantageously eliminates the need for an additional piece of material to be welded to the muffler projection or exhaust conduit to form a tab. By providing a stamped tab and notch system or an embossed tab and notch system, the present invention allows easy and accurate locating and alignment, while maximizing the area of the contacting surfaces between the muffler pipe and the exhaust conduct to improve the seal and to reduce the amount of the combustion product leaking out of the exhaust system at the joint between the muffler pipe and the exhaust conduct.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is an exploded perspective view illustrating a first embodiment of the apparatus utilizing a stamped tab and a stamped notch for aligning first and second exhaust pipes or conduits;

FIG. 2 is a partial end view of a first exhaust conduit illustrating a radially inwardly formed ramp surface for aligning the first conduit relative to the second conduit;

FIG. 3 is an exploded perspective view similar to FIG. 1 illustrating an alternative embodiment of the apparatus having a radially inwardly extending rectangular stamped tab and a stamped notch for aligning first and second exhaust conduits;

FIG. 7 is an exploded perspective view of another embodiment of the present invention including a first exhaust conduit having a generally L-shaped notch cut therein and a second exhaust conduit having an embossed tab for engaging the L-shaped notch of the first exhaust conduit;

FIG. 8 is an exploded perspective view of another embodiment of the apparatus utilizing a stamped circular tab and a stamped notch; and FIG. 9 is an exploded perspective view of an embodiment similar to the embodiment of FIG. 8 but having an embossed circular tab and an embossed notch.

DETAILED DESCRIPTION OF THE DRAWINGS

Figure 4:
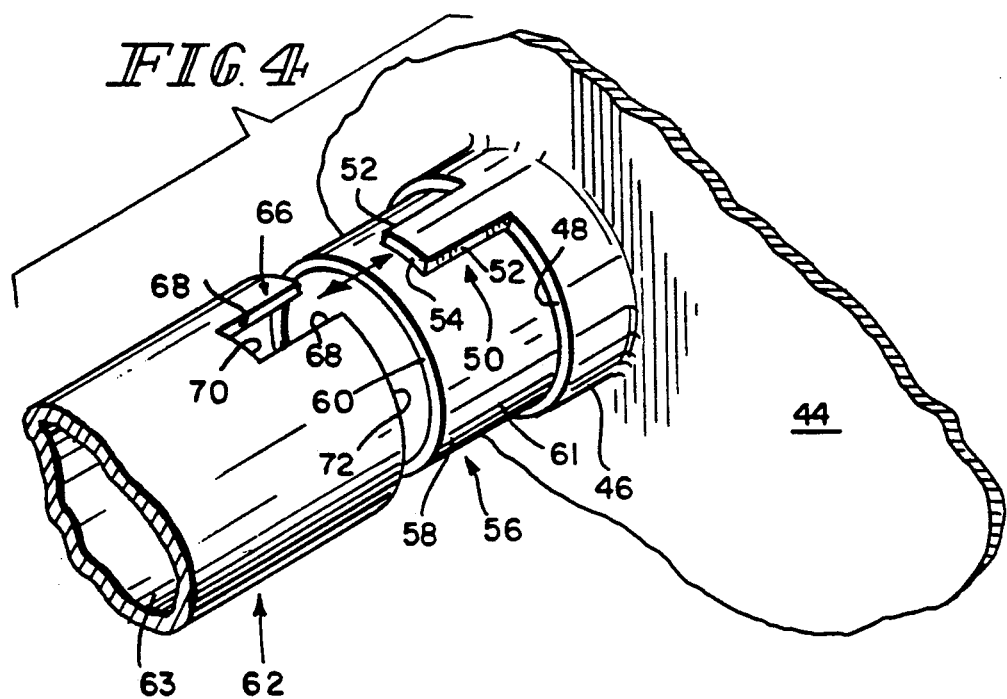
FIG. 4 is an exploded perspective view illustrating another embodiment of the present invention for coupling an exhaust conduit to a muffler head.

As illustrated in FIG. 1, a first exhaust conduit 10 and a second exhaust 12 conduit are coaxially aligned. Second exhaust conduit 12 has an outer diameter defined by outer surface 16 which is substantially equal to the inner diameter of first exhaust conduit 10 defined by inner surface 14. Therefore, second exhaust conduit 12 can be inserted into first exhaust conduit 10. When inserted, inner surface 14 of first exhaust conduit 10 abuts outer surface 16 of second exhaust conduit 12, thereby providing a snug fit between first and second exhaust conduits 10 and 12. A sealing area is defined by the area of surface contact between inner surface 14 of first exhaust conduit 10 and outer surface 16 of second exhaust conduit 12. The sealing area restricts the escape of exhaust gases or combustion product from the joint between the first and second exhaust conduits 10 and 12.

A generally rectangularly shaped tab 18 is formed in first exhaust conduit 10 and is sized and aligned to engage a rectangularly shaped depression or notch 20 formed in second exhaust conduit 12 when second exhaust conduit 12 is inserted into first exhaust conduit 10. Tab 18 is formed by stamping a radially inwardly extending ramp 22 into first exhaust conduit 10 so that a portion of exhaust conduit 10 is deflected radially inwardly. Ramp 22 is defined by an end 24 which is substantially flush with outer surface 25 of first conduit 10. As illustrated in FIG. 2, tab 18 includes a pair of axially extending, vertical sidewalls 26, and a vertical end wall 28. End wall 28 is substantially parallel to edge 24 and substantially perpendicular to sidewalls 26.

Notch 20 is formed on second exhaust conduit 12 to mate with or engage tab 18 formed on first exhaust conduit 10. The notch 20 extends from an end edge 34 of second exhaust conduit 12 and is formed by stamping a generally rectangularly shaped portion of second exhaust conduit 12 radially inwardly. Notch 20 is defined by a pair of axially extending sidewalls 36, and an end wall 38 substantially perpendicular to sidewalls 36. Notch 20 has a size and shape which is complementary to the shape of tab 18.

Tab 18 and notch 20 are formed so that the side walls 26 of the tab 18 abut side walls 36 of the notch 20, and end wall 28 of the tab 18 abuts end wall 38 of the notch 20 upon insertion of second exhaust conduit 12 into first exhaust conduit 10. Engagement of side walls 26 of tab 18 with side walls 36 of notch 20 prevents rotation of conduit 10 relative to conduit 12 and maintains conduits 10 and 12 in a predetermined alignment. The length of notch 20 is substantially equal to the length of tab 18. It is understood that exhaust conduit 10 may be mated with an appropriately sized exhaust conduit which is formed to include a cut out notched section, such as notch 66 in FIG. 4, for engaging tab 18.

End wall 28 is positioned a predetermined distance from end edge 30 of first exhaust conduit 10 to form a band 39. Band 39 provides an additional overlap between the first and second exhaust conduits 10 and 12, respectively, beyond that provided by the mating of the tab 18 and notch 20. Band 39 provides an additional sealing area, thereby further restricting the escape of combustion product from the joint.

Advantageously, tab 18 and notch 20 can each be formed by a single stamping step in the manufacturing process using a die and punch, thereby saving time and eliminating some of the complexity of the manufacturing process. Furthermore, the material used to form the tab is a part of exhaust conduit 10. This provides further cost savings by obviating the need to weld a separate piece of material onto conduit 10 to form the tab.

Another embodiment of the invention is illustrated in FIG. 3. A rectangular tab 19 is stamped radially inwardly into the first conduit 10 in a fashion similar to the tab 18 in the embodiment of FIG. 1. However, the tab 19 in FIG. 3 is deflected radially inwardly so that the entire portion 23 lies parallel to the outer surface 25 of the first conduit 10, rather than ramped as shown in FIG. 1. Thus, the entire inwardly deflected portion 23 of the tab 19 operably abuts the notch 20, providing a larger sealing area to further restrict the escape of exhaust gases.

Yet another embodiment of the present invention is illustrated in FIG. 4. A muffler head 44 is formed to include a tubular projection 46 extending generally perpendicularly from the muffler head 44 and directed outwardly from a muffler (not shown). Projection 46 is formed to include an end edge 48. A generally rectangular tab 50 is formed to extend axially outwardly from end edge 48. Tab 50 is defined by a pair of axially extending side walls 52 and an end wall 54.

A nipple 56, having an outer surface 58 with a diameter substantially equal to an inner diameter of projection 46, is inserted into the projection 46. Therefore, outer surface 58 of nipple 56 engages the inner surface of projection 46 to form a sealing area therebetween. Tab 50 lies against outer surface 58 of nipple 56. Nipple 56 is positioned so that the end wall 54 of tab 50 is spaced apart axially from an end edge 60 of nipple 56 so that a band 61 of nipple 56 is exposed.

An exhaust conduit 62 is inserted over nipple 56 to discharge combustion product from the muffler. Exhaust conduit 62 has an inner diameter defined by inner wall 63 which is substantially equal to the outer diameter of nipple 56, thereby providing a sealing area formed by sliding exhaust conduit 62 over the nipple 56 to restrict the escape of combustion product from the joint.

A notch 66 is punched out of an end of exhaust conduit 62. The shape of notch 66 corresponds to the shape of tab 50. Notch 66 is defined by a pair of axially extending side walls 68 and an end wall 70 which is generally perpendicular to side walls 68. The length of side walls 68 of notch 66 is substantially equal to the length of side walls 52 of tab 50, so that end wall 70 of notch 66 abuts end wall 54 of tab 50 after exhaust conduit 62 is inserted over nipple 56. End edge 72 of the exhaust conduit 62 abuts end edge 48 of muffler head projection 46. Locating the end wall 54 of the tab 50 axially spaced apart from end edge 60 of nipple 56 defines a band 61 which provides additional sealing area for improving the seal between nipple 56 and exhaust conduit 62 thereby restricting the escape of combustion product from the joint.

Figure 5:
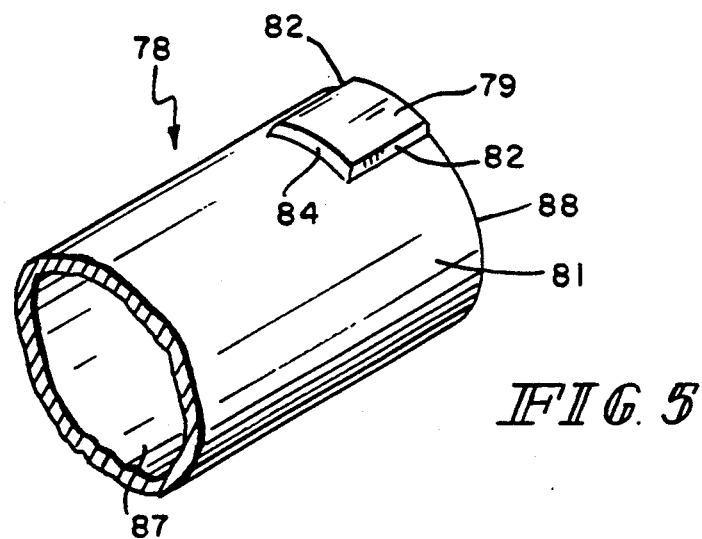
FIG. 5 is a perspective view illustrating a radially outwardly embossed notch on an exhaust conduit designed to be coupled to the muffler head illustrated in FIG. 4.
Figure 6:
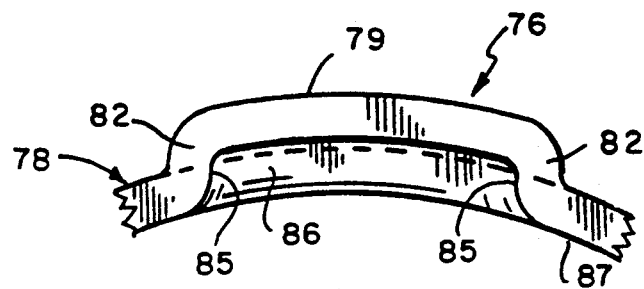
FIG. 6 illustrates a partial end view of the embossed notch of FIG. 5.

Alternatively, embossed notch 76 similar to that shown in FIG. 5 is formed on an exhaust conduit 78 for engagement with tab 50 in the embodiment of FIG. 4. As shown in FIGS. 5 and 6, embossed notch 76 is formed by deforming exhaust conduit 78 radially outwardly so that substantially rectangularly shaped section 79 of exhaust conduit 81 is raised above the surrounding outer surface 79 and exhaust conduit 78. Notch 76 is defined by a pair of axially extending side walls 82 and an end wall 84 which is perpendicular to side walls 82 and disposed therebetween. Side walls 82 of the notch 76 are substantially equal in length to side walls 52 of tab 50. (FIG. 4).

FIG. 6 is an end view illustrating embossed notch 76. Embossed notch 76 includes internal side walls 85 and an internal end wall 86. Exhaust conduit 78 has an inner diameter defined by inner surface 87 which is substantially equal to the outer diameter of nipple 56 so that exhaust conduit 78 can be snugly inserted over nipple 56. Embossed notch 76 passes over tab 50. Internal end wall 86 of embossed notch 76 abuts end wall 54 of tab 50. Internal side walls 85 are configured to abut side walls 52 of tab 50. Engagement of internal side walls 85 with side walls 52 of tab 50 prevents rotation of exhaust conduit 78 about its longitudinal axis relative to muffler head 44. End edge 88 of the exhaust conduit 78 abuts edge 48 of projection 46. Therefore, the mating of embossed notch 76 with tab 50 maintains alignment between exhaust conduit 78 and muffler head 44. It is understood that exhaust conduit 78 may be mated with an appropriately sized exhaust conduit which is formed to include a cut out notched section, such as notch 66 in FIG. 4, for engaging embossed notch 76.

A further embodiment of the invention is illustrated in FIG. 7. The FIG. 7 embodiment discloses an L-shaped notch 92 cut into a first exhaust conduit 94. Notch 92 is formed by cutting or punching a longitudinally extending channel 96 and a circumferential channel 98 in exhaust conduit 94 so that channel 96 terminates at one end of the circumferential channel 98. Longitudinally extending channel 96 is in communication with an end edge 99 of exhaust conduit 94.

An embossed tab 100 is formed on a second exhaust conduit 110 by deforming exhaust conduit 110 radially outwardly so that a circular tab 114 is raised above the surrounding outer surface 115 of exhaust conduit 110. The diameter of embossed tab 100 defined by outer wall 116 is substantially equal to the width of the axial and circumferential channels 96 and 98, respectively. Therefore, outer wall 116 of the tab 100 abuts opposite side walls 118 of the axial channel 96 and opposite side walls 120 of the circumferential channel 98.

The outer diameter of second exhaust conduit 110 defined by outer surface 115 is substantially equal to the inner diameter of first exhaust conduit 94 defined by inner wall 119. Therefore, first exhaust conduit 94 can snugly slide over second exhaust conduit 110. The tab 100 is positioned a predetermined distance from an end edge 112 of the second exhaust conduit 110. Therefore, first conduit 94 overlaps second conduit 110 to provide a sealing area for restricting the escape of combustion product from the joint between the exhaust conduits 94 and 110.

Second exhaust conduit 110 is inserted into first exhaust conduit 94 so that tab 100 is aligned with channel 96. Second exhaust conduit 110 is inserted at a predetermined distance into first exhaust conduit 94 until tab 100 is aligned with circumferential channel 98. Second exhaust conduit 110 is then rotated relative to first exhaust conduit 94 so that tab 100 moves down circumferential channel 98 and abuts end wall 121. Movement of tab 100 through channel 96 and channel 98 prevents movement of second exhaust conduit 110 relative to first exhaust conduit 94 in a direction along longitudinal axis of the first and second exhaust conduits 94 and 110. This holds first and second exhaust conduits 94 and 110 in a predetermined orientation so that the exhaust conduits can be welded or clamped together to provide further sealing.

It is understood that tab 100 can also be stamped radially inwardly into second exhaust conduit 110. In this embodiment, second exhaust conduit 110 has an inner diameter defined by inner surface 122 which is substantially equal to an outer diameter of first exhaust conduit 94 defined by outer surface 124. The inwardly stamped tab has a diameter substantially equal to the width of channels 96 and 98 so that as second exhaust conduit 110 is inserted over first exhaust conduit 94, the inwardly stamped tab enters channel 96. Second exhaust conduit 110 is then rotated so that the inwardly extending tab moves into channel 98 to prevent axial movement of second exhaust conduit 110 relative to first exhaust conduit 94.

FIGS. 8 and 9 illustrate yet other embodiments to the present invention. While rectangular notches 20 (FIG. 9) and 21 (FIG. 10) are substantially identical to notches shown in FIGS. 1 and 3, respectively, tabs 123 and 124 are circular, similar to tab 100 discussed with reference to FIG. 8. In FIG. 8, tab 123 is stamped inwardly into the conduit 126. The diameter of tab 123 is substantially equal to the distance between side walls 36 formed in notch 20, and the depth of tab 123 is sufficient to allow tab 123 to operably abut notch 20.

In FIG. 9, tab 124 is embossed radially outwardly from conduit 128. The diameter of tab 124 is substantially equal to the distance between side walls 37 formed in notch 21, and the depth of tab 124 is sufficient to allow tab 124 to operably abut notch 21.

While reference has been made to rectangular tabs and notches, the invention is not limited to that geometry. For example, the tabs could be circular, oval or any other suitable shape. Nor is the invention limited to a singular tab engaging a singular notch. For example, a generally W-shaped tab having two tabular projections could engage a compatibly sized and conforming W-shaped notch. Moreover, although reference has been made to stamped tabs and notches in FIGS. 1-3 and 8, the tabs and notches in those embodiments may be embossed and still remain within the scope of the invention. Likewise, the embossed tabs and notches in FIGS. 5-7 and 9 may be stamped without exceeding the scope of the invention. Furthermore, while reference has been made to exhaust conduits, it will be understood that the present invention applies equally to pipes, ducts, tubes, hoses or other methods of conducting exhaust gases from an engine for further processing.

Although the invention has been described in detail with reference to certain preferred embodiments, variations and modifications exist within the scope and spirit of the invention as described as defined in the following claims.

We claim:

1. An exhaust system comprising:
   a muffler having a muffler head formed to include an outwardly extending projection and a tab formed on the projection;
   a nipple configured to be inserted through the projection of the muffler head; and
   an exhaust conduit for conducting combustion product from the muffler to the atmosphere, the exhaust conduit being sized for insertion over the nipple to couple the exhaust conduit to the muffler head, the exhaust conduit being formed to include a notched section for engaging the tab formed on the projection of the muffler head to align the exhaust conduit relative to the muffler head and to prevent rotation of the exhaust conduit relative to the muffler head.

2. The system of claim 1, wherein the notched section formed in the exhaust conduit extends radially outwardly from an outer surface of the exhaust conduit.

3. The system of claim 1, wherein the notched section is cut out of the exhaust conduit.

4. The system of claim 1, wherein the tab includes first and second side walls and an end wall extending radially outwardly from an outer surface of the nipple and the notched section is formed to include first and second side walls and an end wall for engaging the first and second side walls and the end wall of the tab, respectively, upon insertion of the exhaust conduit over the nipple.

5. The system of claim 4, wherein the first and second side walls and an end wall of the notched section extend radially outwardly from an outer surface of the exhaust conduit.

6. The system of claim 4, wherein the nipple includes an end edge spaced apart from the end wall of the tab to define a band therebetween, the band abutting an inner surface of the exhaust conduit upon insertion of the exhaust conduit over the nipple.

7. An exhaust system comprising
   a first exhaust conduit having a longitudinal axis and formed to include a longitudinally extending embossed tab having first and second side walls and an end wall, and
   a second exhaust conduit coupled to the first exhaust conduit, the second exhaust conduit being formed to include a notched section complementary to the tab, the notched section including first and second side walls and an end wall for engaging the first and second side walls and the end wall of the tab formed on the first exhaust conduit, respectively, to align the second exhaust conduit relative to the first exhaust conduit and to prevent rotation of the second exhaust conduit relative to the first exhaust conduit.

8. The system of claim 7, wherein the notched section formed in the second exhaust conduit extends radially outwardly from an outer surface of the second exhaust conduit.

9. The system of claim 7, wherein the notched section is cut out of the second exhaust conduit.

10. An exhaust system comprising:
    a first exhaust conduit formed to include a radially inwardly extending ramp oriented at an angle relative to an outer wall of the first exhaust conduit, the ramp having a first end substantially aligned with an outer wall of the first exhaust conduit, a second end located radially inwardly from an inner wall of the first exhaust conduit, and first and second side walls extending between the first and second ends to define a radially inwardly extending, angled tab; and
    a second exhaust conduit coupled to the first exhaust conduit, the second exhaust conduit being formed to include a notched section complementary to the tab, the notched section including first and second side walls and an end wall for engaging the first and second side walls and the second end wall of the tab on the first exhaust conduit, respectively, to align the second exhaust conduit relative to the first exhaust conduit and to prevent rotation of the second exhaust conduit relative to the first exhaust conduit.

11. The system of claim 10, wherein the notched section formed in the second exhaust conduit extends radially inwardly from an outer surface of the second exhaust conduit.

12. The system of claim 10, wherein the notched section is cut out of the second exhaust conduit.

13. An exhaust system comprising
a first exhaust conduit formed to include a radially inwardly extending ramp oriented at an angle relative to an outer wall of the first exhaust conduit, the ramp having a first end substantially aligned with an outer wall of the first exhaust conduit, a second end located radially inwardly from an inner wall of the first exhaust conduit, and first and second side walls extending between the first and second ends to define a radially inwardly extending, angled tab; and
a second exhaust conduit coupled to the first exhaust conduit, the second exhaust conduit being formed to include a notched section complementary to the tab, the notched section including first and second side walls and an end wall for engaging the first and second side walls and the second end wall of the tab on the first exhaust conduit, respectively, to align the second exhaust conduit relative to the first exhaust conduit and to prevent rotation of the second exhaust conduit relative to the first exhaust conduit, the first exhaust conduit including an end edge spaced apart from the second end wall of the ramp to define a band therebetween, the band abutting an outer surface of the second exhaust conduit upon insertion of the first exhaust conduit over the second exhaust conduit.

14. An exhaust system comprising:
a first exhaust conduit formed to include tab therein, the tab having a predetermined width dimension; and
a second exhaust conduit coupled to the first exhaust conduit, the second exhaust conduit being formed to include a L-shaped notch therein, the L-shaped notch including an axially extending straight section in communication with an end edge of the second exhaust conduit and a circumferentially extending straight section in communication with the axially extending section and spaced apart from the end edge, the L-shaped notch being defined by side walls which are spaced apart by a distance substantially equal to the width dimension of the tab for receiving the tab therein to align the second exhaust conduit relative to the first exhaust conduit and to prevent axial movement of the second exhaust conduit relative to the first exhaust conduit when the tab is positioned in the circumferentially extending straight section of the L-shaped notch.

15. The system of claim 14, wherein the tab extends radially outwardly from an outer surface of the first exhaust conduit.

16. The system of claim 15, wherein the L-shaped notch is formed by stamping an L-shaped section out of the second exhaust conduit.

17. The system of claim 15, wherein the L-shaped notch extends radially outwardly relative to an outer surface of the second exhaust conduit.

18. The system of claim 14, wherein the tab extends radially inwardly from an outer surface of the first exhaust conduit.

19. The system of claim 18, wherein the L-shaped notch is formed by stamping an L-shaped section out of the second exhaust conduit.

20. The system of claim 18, wherein the L-shaped notch extends radially inwardly relative to an outer surface of the second exhaust conduit.

* * * * *